(12) United States Patent
Bartoli et al.

(10) Patent No.: US 10,246,205 B2
(45) Date of Patent: Apr. 2, 2019

(54) APPARATUS AND METHOD FOR MAKING CAPSULES WITH FILTER

(71) Applicant: Sarong Societa' per Azioni, Reggiolo (IT)

(72) Inventors: Andrea Bartoli, Reggio Emilia (IT); Flavio Traldi, San Prospero (IT)

(73) Assignee: Sarong Societa' per Azioni (IT)

( * ) Notice: Subject to any disclaimer, the term of this patent is extended or adjusted under 35 U.S.C. 154(b) by 1077 days.

(21) Appl. No.: 14/400,195

(22) PCT Filed: May 14, 2013

(86) PCT No.: PCT/IB2013/053902
§ 371 (c)(1),
(2) Date: Nov. 10, 2014

(87) PCT Pub. No.: WO2013/171663
PCT Pub. Date: Nov. 21, 2013

(65) Prior Publication Data
US 2015/0128525 A1   May 14, 2015

(30) Foreign Application Priority Data

May 14, 2012 (IT) .............................. MO2012A0128

(51) Int. Cl.
*B65B 29/02* (2006.01)
*B65B 3/02* (2006.01)
(Continued)

(52) U.S. Cl.
CPC .............. *B65B 29/02* (2013.01); *B29C 51/04* (2013.01); *B65B 3/022* (2013.01); *B65B 29/022* (2017.08);
(Continued)

(58) Field of Classification Search
CPC ....... B29C 51/04; B29C 51/262; B29C 51/08; B29C 51/165; B29C 2791/001;
(Continued)

(56) References Cited

U.S. PATENT DOCUMENTS 4,200,481 A * 4/1980 Faller .................... B29C 51/165
156/285
4,236,885 A * 12/1980 West ....................... B29C 51/16
425/503

(Continued)

FOREIGN PATENT DOCUMENTS

EP        0224297 A1    6/1987
EP        1997748 A1   12/2008
(Continued)

*Primary Examiner* — Thanh K Truong
*Assistant Examiner* — Thomas M Wittenschlaeger
(74) *Attorney, Agent, or Firm* — Laubscher & Laubscher, P.C.

(57) ABSTRACT

An apparatus for making a capsule provided with a shell containing a filtering element suitable for receiving a product for preparing a beverage or the like includes a superimposing assembly for applying a film of filtering material to at least one shell with a cavity in order to cover an opening of the cavity. The shell is moved along a first advancement direction and the apparatus further includes a locking assembly to lock the film to the shell, and a first stretching device included in a first stretching station for heating and stretching a portion of the film facing the cavity in order to obtain a filtering element.

18 Claims, 4 Drawing Sheets

(51) Int. Cl.
   *B65B 51/04* (2006.01)
   *B65B 51/10* (2006.01)
   *B65B 61/00* (2006.01)
   *B65B 7/28* (2006.01)
   *B29C 51/04* (2006.01)
   *B65B 47/02* (2006.01)
   *B65B 47/06* (2006.01)
   *B65D 85/804* (2006.01)
   *B29C 51/26* (2006.01)
   *B29L 31/00* (2006.01)
   *B29L 31/56* (2006.01)

(52) U.S. Cl.
   CPC .............. *B65B 47/02* (2013.01); *B65B 47/06* (2013.01); *B65B 51/04* (2013.01); *B65B 51/10* (2013.01); *B65B 61/00* (2013.01); *B65D 85/8043* (2013.01); *B29C 51/262* (2013.01); *B29C 2791/001* (2013.01); *B29L 2031/565* (2013.01); *B29L 2031/7132* (2013.01)

(58) Field of Classification Search
   CPC ......... B65B 29/02; B65B 29/06; B65B 29/00; B65B 29/022; B65B 47/02; B65B 47/06; B65B 47/00; B65B 47/04; B65B 47/08; B65B 47/10; B65B 61/00; B65B 3/022; B65B 51/04; B65B 51/10; B65B 7/2842; B65B 1/02; B65B 1/04; B65B 1/06; B65B 9/04; B65D 85/8043; B65D 25/14; B29L 2031/565; B29L 2031/7132; B31B 2120/406; B21D 22/206; B21D 22/208; B21D 22/28
   USPC ...... 53/453, 559, 561, 471, 281, 282, 284.5, 53/474, 237, 238, 240
   See application file for complete search history.

(56) References Cited

U.S. PATENT DOCUMENTS

2009/0173043 A1    7/2009   Bloome et al.
2009/0211713 A1*   8/2009   Binacchi ................. B65B 29/02
                                                          156/423

FOREIGN PATENT DOCUMENTS

WO    2008129350 A1    10/2008
WO    2013064988 A1    5/2013

* cited by examiner

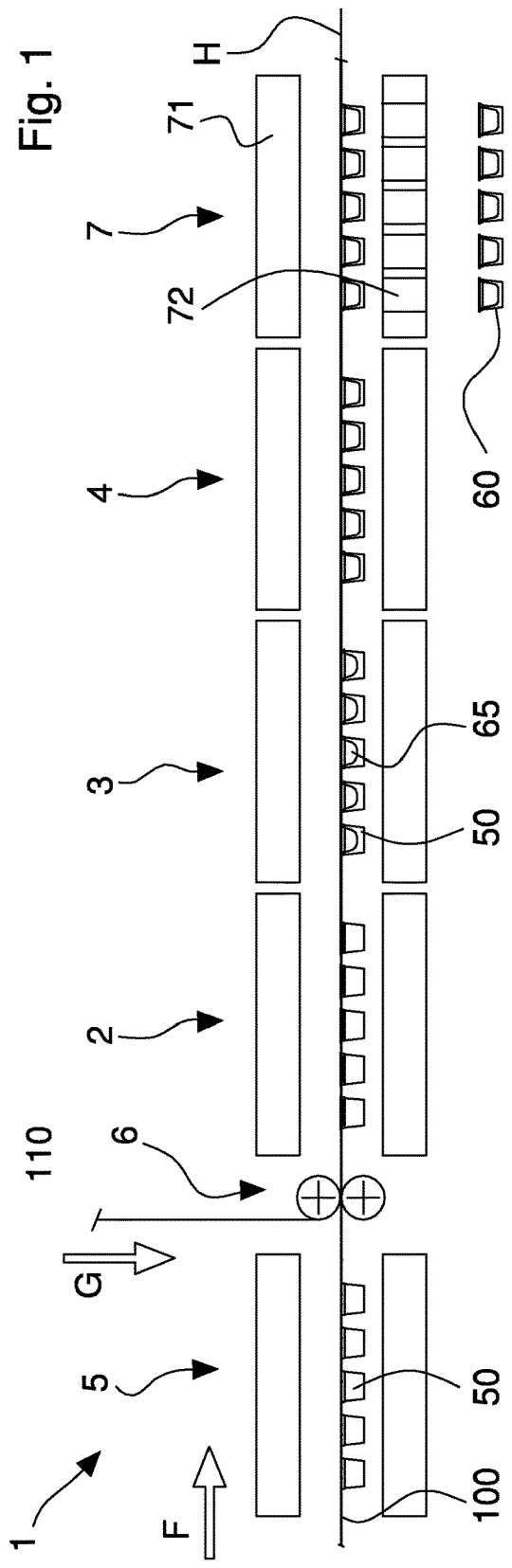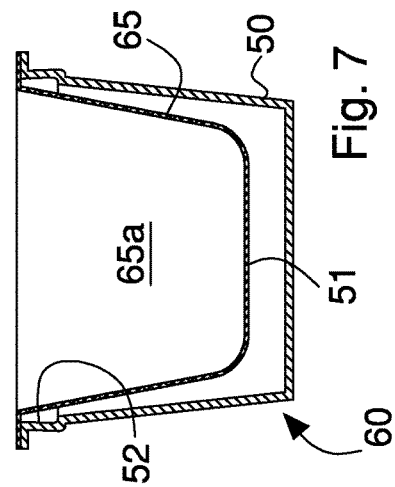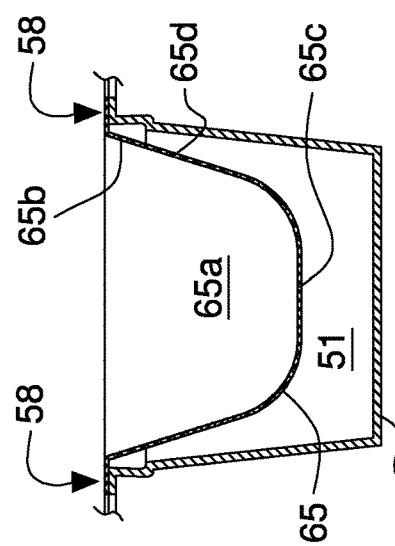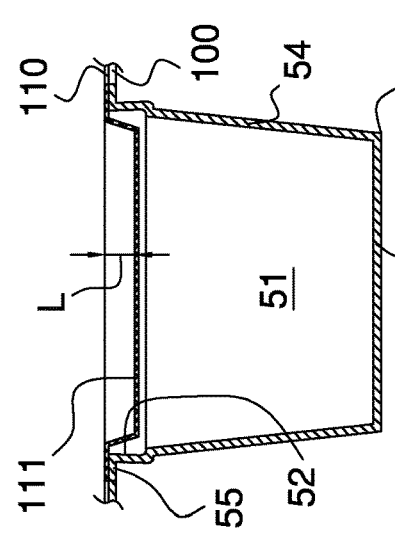

APPARATUS AND METHOD FOR MAKING CAPSULES WITH FILTER

This application is a § 371 National Stage entry of PCT International Application No. PCT/IB2013/053902 filed May 14, 2012. PCT/IB2013/053902 claims priority to IT Application No. MO2012A000128 filed May 14, 2012. The entire contents of these applications are incorporated herein by reference.

BACKGROUND OF THE INVENTION

The present invention relates to apparatuses and methods for making objects by forming a sheet of thermoformable plastics. In particular, the invention relates to an apparatus and a method for making capsules, or similar containers, provided with an internal filter suitable for containing a product for the preparation of a beverage, for example, coffee or tea.

DESCRIPTION OF THE PRIOR ART

Disposable capsules are known, which are sealed with an internal filtering element or filter, comprising an outer container or shell, made of plastics, in the shape of a glass or a cup, provided with a bottom wall and a side wall defining an open cavity. The opening of the latter one is hermetically closed by a cover element so as to seal within the shell cavity the filtering element containing the product from which the beverage has to be obtained. The cover element and the bottom wall of the container are generally perforable to allow the insertion of a pressurized liquid, typically water (typically through the cover element), and the withdrawal of the beverage obtained by percolation of the above-mentioned liquid through the product (typically through the bottom wall).

The filter, that is shaped so as to make a respective cavity that is open upwardly to contain the product, is welded to the side wall of the container at an upper peripheral edge thereof. Therefore, the filter divides the inside of the container in a first upper chamber containing the product and accessible through the upper opening of the container (to allow the filling thereof) and a second lower chamber, comprised between the filter and the bottom wall and/or the side wall of the container, which allows withdrawing the beverage obtained from the product.

The shell in plastics and the filtering element are generally manufactured separately, and associated in a packaging machine, which also provides to fill with the product for the preparation of the beverage and then to close with the cover element the capsule.

The capsule shell can be made in thermoforming apparatuses including a plurality of operative stations through which a sheet of thermoformable plastics unwound from a reel is advanced by a suitable advancing assembly.

The operative stations generally comprise, in sequence, a heating station, a forming station, and a cutting station.

In the heating station, the sheet material is prepared for the successive forming operation, i.e., it is heated up to a predetermined softening temperature, so as to increase the plasticity and deformability thereof. The forming station comprises a forming mould in which one or more punches push the sheet inside respective cavities of a die, so as to produce the shells. In the cutting station, a cutting element separates the shells formed on the sheet of plastics, cutting the latter according to predetermined cutting outlines.

The capsule shell may alternatively be made in injection forming apparatuses comprising a closed mould in which plastics at the melting temperature is injected at high pressure to make a single capsule or a plurality of capsules, for example arranged in rows or in a bidimensional array.

The filtering element, composed of a permeable material, such as filter paper or nonwoven fabric, is made by suitably folding to form a cavity (typically with a conical or frustum-conical shape) a portion of material cut off from a film of the above-mentioned material unwound from a reel.

The filtering elements are inserted in the respective shells of the capsule and fixed thereto by welding in the packaging machine.

The above-described making method is complex and laborious, and requires that the packaging machine is provided with a station capable of assembling the capsules, i.e., of fixing the filtering elements to the respective shells.

The steps of withdrawal, handling, and insertion of the filtering elements are particularly critical due to the fragility and instability of the filtering elements once folded and shaped. The elements of the assembling station has to be very precise and accurate to ensure that the filtering element is not damaged, deformed or erroneously positioned in the capsule, thus causing the rejection of the capsule and reduction in packaging machine productivity.

Therefore, such machine is more complex and expensive than the packaging machines typically used to fill capsules with products such as coffee, tea, and the like.

The transport and transfer of the shells and the filtering elements from the respective manufacturing apparatuses to the packaging machine further requires that the above-mentioned shells and filtering elements are inserted within intermediate sealed packages to ensure the integrity and hygiene thereof. Such intermediate packaging, in addition to require time, is expensive.

Apparatuses are also known, which allow producing both the containers, made by thermoforming, and the filtering elements and associating them so as to obtain capsules ready to be used in a substantially standard packaging machine.

Such apparatuses include operating stations for the production of the shells, operating stations for the production of the filtering elements, and a device to handle and a filtering element inside each shell.

The handling and insertion operations of the filtering elements are also in this case particularly critical and complex, due to the fragility and instability of the filtering elements, once folded and shaped. In fact, the filtering elements can be easily damaged or deformed or erroneously positioned in the shells. Such apparatuses are subjected to a high number of capsules to be rejected, and have a reduced productivity.

BRIEF SUMMARY OF THE INVENTION

An object of the present invention is to improve the known apparatuses for making capsules comprising a shell or container housing an internal filtering element arranged to receive a product for the preparation of a beverage or the like.

Another object is to make an apparatus that allows associating shells to filtering elements formed by a film of filtering material in an accurate ad efficient manner, so as to obtain capsules ready to be filled with a product.

Still another object is to make an apparatus that allows producing shells thermoformed from a sheet of plastics and filtering elements formed by a film of filtering material, associating in an accurate ad efficient manner the filtering elements to the respective shells.

A further object is to make an apparatus having a simple and reliable operation, with a high productivity.

In a first aspect of the invention, an apparatus for making capsules according to claim 1 is provided.

In a second aspect, a method for making capsules according to the claim 14 is provided.

BRIEF DESCRIPTION OF THE DRAWINGS

The invention will be better understood and implemented with reference to the appended drawings, which illustrate some exemplary, non-limiting embodiments thereof, in which:

FIG. 1 is a front schematic view of the forming apparatus of the invention;

FIGS. 5, 6 and 7 are sections of a capsule made by the forming apparatus in FIG. 1 at successive operative stations.

DETAILED DESCRIPTION OF THE INVENTION

Figure 2:
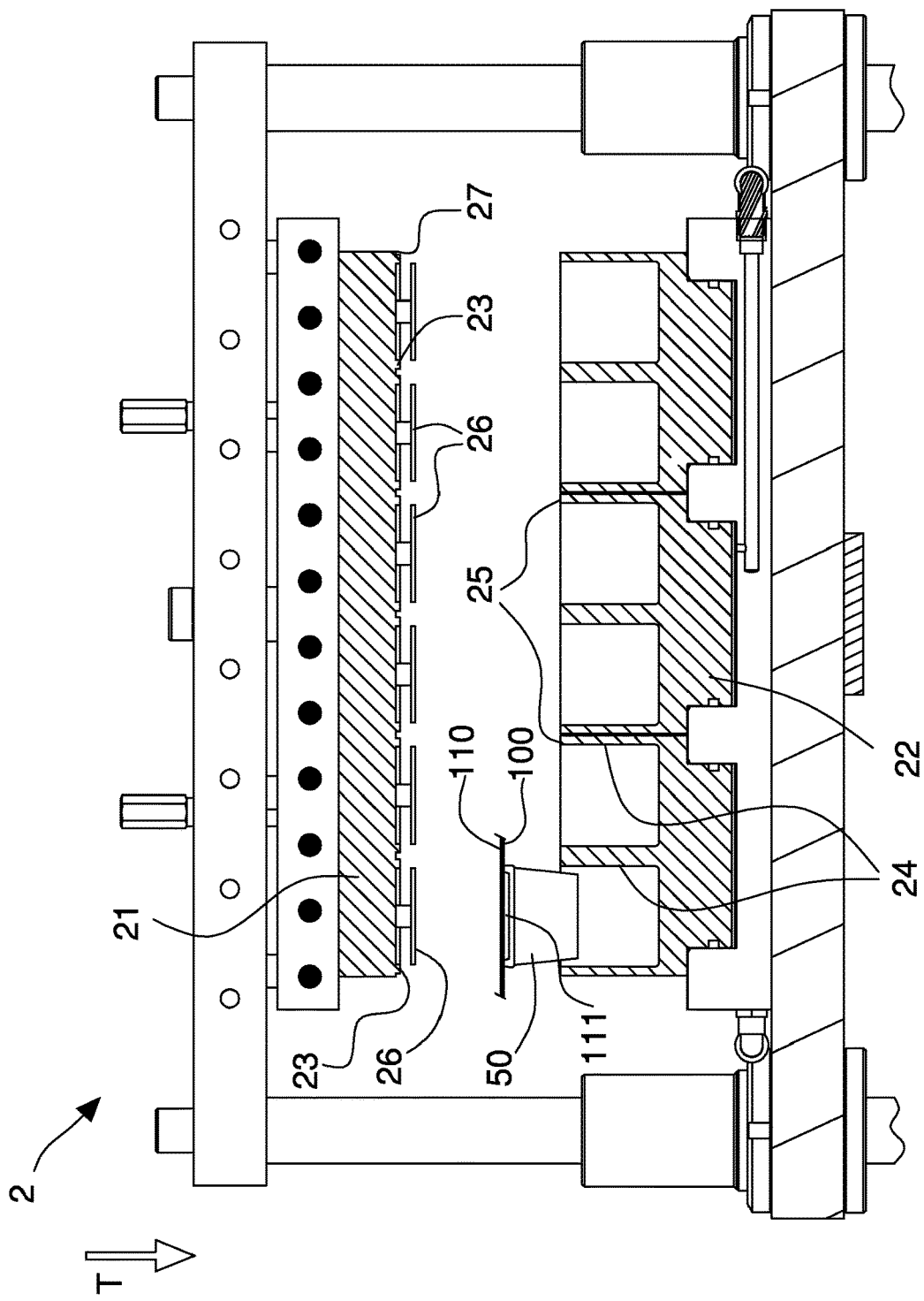
FIG. 2 is a cross-section of a sealing station of the apparatus in FIG. 1.

With reference to FIG. 1, the thermoforming apparatus 1 of the invention is schematically illustrated arranged to make one or more capsules 60, each of which comprising a shell or container 50 provided with a cavity 51 containing a filtering element or filter 65 arranged to receive a product for the preparation of a beverage, for example coffee or tea.

The shell 50 is made by thermoforming of a mono- or multilayer sheet 100 of thermoformable plastics.

The filtering element 65 is made from a film 110 of filtering material, in particular a nonwoven fabric material containing threads or fibers of plastics that, by melting, allow to weld it, as better explained in the following of the description.

The apparatus 1 includes a superimposing assembly 6 to apply a filtering film material 110 to the thermoformable plastics sheet 100 from which at least one shell 50 including a cavity 51 has been formed in order to cover an opening 52 of the cavity 51.

The sheet 100 and the film 110 are moved along a first advancement direction F. In particular, the sheet 100 is unwound from a respective reel and moved along a plane H, for example, a horizontal plane, with intermittent reciprocated motion by a known advancing device not shown. The film 110 is unwound from a respective reel (not illustrated), moved along a second direction G, for example orthogonal to the first direction F, and deflected and superimposed on the sheet 100 by deflecting rolls 16 of the superimposing assembly.

Each shell 50 can alternatively be made, according to a non-illustrated version, by injection molding of plastics at a suitable melting temperature. A plurality of shells 50 arranged in a row or in a bidimensional array, mutually connected or individually distinct and suitably inserted in a support device of a known type, can be supplied along a movement plane to the superimposing assembly 6. The film 110 of filtering material unwound from a reel can be thus applied to each shell 50, similarly to what has been illustrated before relative to shells 50 obtained by thermoforming.

The film 110 of filtering material could also be supplied alternatively to the superimposing assembly 6 in pre-cut parts rather than from a reel.

The apparatus 1 includes a locking assembly to lock the film 110 to the shell 50 and a first stretching device included in a first stretching station 3, to heat and stretch a portion 111 of the film 110 locked by the locking device, facing and partially within the cavity 51 in order to obtain the filtering element 65.

A second stretching station 4 is provided downstream of the first stretching station 3, with reference to the first direction F, including a second stretching device for further stretching and stabilizing the filtering element 65, the film 110 being locked to the shell 50 by the locking device.

The apparatus includes a forming station 5 arranged for thermoforming the sheet 100 of thermoformable plastics in order to obtain the shell 50. The forming station 5 is arranged upstream of the superimposing assembly 6 with reference to the first direction F.

The apparatus 1 further comprises a sealing station 2 arranged to fix the film 110 to the shell 50.

As illustrated in FIG. 5, the shell 50 comprises a base wall 53 and a side wall 54 defining the open cavity 51. To the side wall 54 is fixed, on a side opposite the base wall 35, a flange rim 55 surrounding the opening 52 of the cavity 51. The flange rim 55 comprises a annular-shaped planar face, for example, circular. The film 110 of filtering material is fixed by welding to the flange rim 55 of the shell 50.

It is noticed that, if the shell 50 is made by thermoforming, the flange rim 55 is still part of the plastics sheet 100 and therefore the film 110 is welded more precisely to the sheet 100 comprising the flange rim 55, in which the shells 50 have been formed and have not been already individually separated by cutting. If the shell 50 is made instead by injection moulding, the film 110 is welded to the flange rim 55 of each shell 50, for example, individually moved.

Without detriment to generality, and for more simplicity, it shall be understood that the film 110 of filtering material is welded to the shell 50 both when the shell 50 is obtained by thermoforming or when the shell is obtained by injection moulding.

A heating station, not illustrated, can be provided upstream of the forming station 5, if present, to heat the sheet 100 up to a softening temperature of the plastics to allow the successive deformation and forming thereof.

As illustrated in the FIG. 1, the various operative stations 5, 2, 3, 4 are arranged to make a plurality of capsules 60.

With particular reference to FIG. 2, the sealing station 2 includes a sealing locking device of the locking device including a first abutting element 21 provided with a sealing device and a second abutting element 22 provided with an abutment wall 25 and with one or more seats 24 to house respective shells 50. The seats 24 are manufactured and open on the abutment wall 25.

The sealing locking device includes one or more heated projections 23 made on a front wall 27 of the first abutting element 21. Each heated projection 23 has substantially the same shape as the flange rim 55 of the shell 50.

In the embodiment illustrated by way of illustrative, non-limiting example, the second abutting element 22 comprises a plurality of seats 24, for example six, and the first abutting element 21 comprises the same number of heated projections 23.

The first abutting element 21 is movable with respect to the second abutting element 22 so that each heated projection 23 is capable of locking and press against the abutment wall 25, thereby mutually welding, the film 110 and the shell 50 at and around the opening 52 of the shell 50, i.e., welding the film 110 to the flange rim 55 of the shell 50 thus obtaining a welded portion 58. In particular, the first abutting element 21 is movable towards, and away from, the second abutting element 22 along a third direction T transversal, in particular orthogonal to the first direction F and to the plane H.

The second abutting element 22 is also movable along the third movement direction T towards, and away from, the plurality of shells 50. More precisely, the second abutting element 22 is movable between a respective first non-operative position in which it is spaced apart from each shell 50 to allow the advancement thereof along the first direction F, and a respective operative position in which it is in contact at least with the flange rim 55 of the shells 50 inserted within the respective cavities 24. The first abutting element 21 abuts against the second abutting element 22 when the latter is arranged in the respective operative position.

The first abutting element 21 includes one or more pushing elements 26, each of which is arranged to push within a respective cavity 51 a portion 111 of the film 110 by a preset amount L, before the heated projections 23 press and seal or weld the film 110 to the flange rim 55 of the shell 50. The number of the pushing elements 26 is equal to the number of the seats 24.

Each pushing element 26 substantially comprises a small plate fixed with a pin to the front wall 27 of the first abutting element 21. When the first abutting element 21 progressively approaches and then abuts against the second abutting element 22, the pushing element 26 pushes and drags within the cavity 51 the portion 111 of the film 110. The pushing element 26 enters the cavity 51 by the amount L, which is calculated so that the portion 111 of the film 110 has dimension (extension) such as to ensure that the filtering material of the film 110 does not tear or break or get unduly thinner during the successive stretching or drawing operations necessary to form and obtain a filtering element 65 with desired dimensions and volume. The pushing element 26 implements a so-called "material enrichment" procedure, since the portion of film 111 affected by the stretching is thus increased before the film 110 is welded.

It is pointed out that the first abutting element 21 can also be devoid of the pushing element 26 if the filtering element 65 is of reduced dimensions and/or volume, and if anyhow the stretching or forming operation of the filtering element 65 itself is moderate and does not require that a portion of film 110 is pre-dragged within the cavity 51 preliminarily. Also, the first abutting element 21 can also be devoid of the pushing element 26 if the sealing station 2 is arranged downstream at least of the first stretching station 3, as it will be illustrated in more detail herein below.

Figure 3:
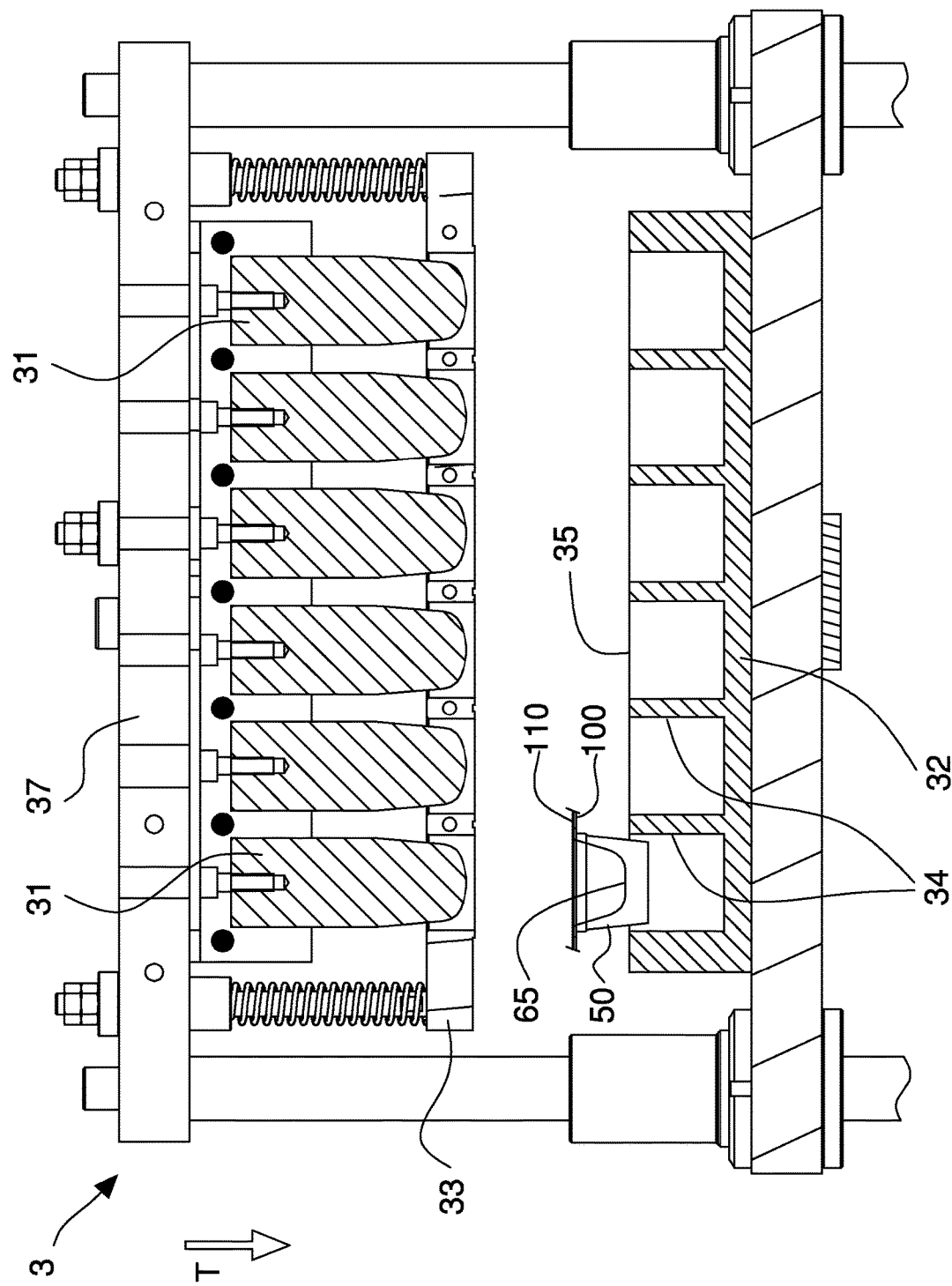
FIG. 3 is a cross-section of a first stretching station of the apparatus in FIG. 1.

With particular reference to FIG. 3, the first stretching assembly is in the stretching station 3 and includes at least one first heated punch 31 and a first die 32 provided with one or more first housings 34 to receive respective shells 51 with corresponding portions 111 of film 110 locked thereto. The sealing station 2 arranged upstream of the first stretching station 3 locks by welding each portion 111 of film 110 to each shell 50 by virtue of the sealing locking device. The film 110 is thus fixed to the flange rim 55 of the shell 50 surrounding the opening 52 of the cavity 51.

The first die 32 comprises a first wall 35 substantially frontal and facing the first punch 31 on which the first housings 34 are obtained and open. In the illustrated embodiment, the first stretching station 3 comprises a plurality of first punches 31, for example six, and the first die 32 comprises the same number of first housings 34.

Each first punch 31 is movable and insertable within the respective first housing 34 so as to heat and stretch the corresponding portion 111 of the film 110 and to form the filtering element 65. The first punch 31 can be coated with a nonstick material (for example, teflon), has a frustum-conical shape, for example, and has a rounded or flat tip.

The first stretching station 3 also includes a first locking device including at least one first locking element 33 movable and arranged for compressing and locking the sheet 100 and the film 110 against the first wall 35 of the die 32, in order to prevent yieldings of the sealed or welded portions or undesired shifts of the sheet 100 and/or shell 50 associated with the film 110 during the stretching step of the portion 111 of the film 110.

The first punches 31 are fixed to a first support element 37 movable along the third direction T towards, and away from, the first die 32. The first locking element 33 is also connected elastically to the first support element 37.

The first die 32 is also movable along the third movement direction T towards, and away from, each shell 50. More precisely, the first die 32 is movable between a respective first non-operative position in which it is spaced apart from each shell 50 to allow the advancement thereof along the first direction F, and a respective operative position in which it is in contact with the flange rim 55 of each shell 50, the shells 50 being inserted within the respective first housings 34.

With the first die 32 arranged in the respective operative position, the first support element 37 is moved towards the above-mentioned first die 32, so that the locking element 33 compresses and locks against the first wall 35 the shell 50 and the film 110. By further moving the first support element 37, the first punches 31 engage in the respective portions 111 of the film 110, which progressively stretch, heat and deform inside the corresponding first housings 34. Each first punch 31 substantially hot forms the corresponding portion 111 of the film 110 thus obtaining the filtering element 65 provided with a respective concavity 65a intended to receive the product with which preparing a beverage. The filtering element 65 has a frusto-conical shape, substantially coincident with that of the first punch 31.

The first punch 31 is heated at a first temperature T1 comprised between 110° C. and 140°, C., in particular between 120° and 135°, preferably 130°, so as to soften the plastics threads or fibers and to make then deformable, which plastics threads or fibers are contained in the filtering material of the film 110. In this manner, the film 110 can be stretched and substantially formed without tearing or breaking; the thickness thereof is progressively and evenly reduced starting from a peripheral portion 65b adjacent to the welded portion 58 of the flange rim 55 up to a bottom wall 65c, facing the base wall 53 of the shell 50.

Figure 4:
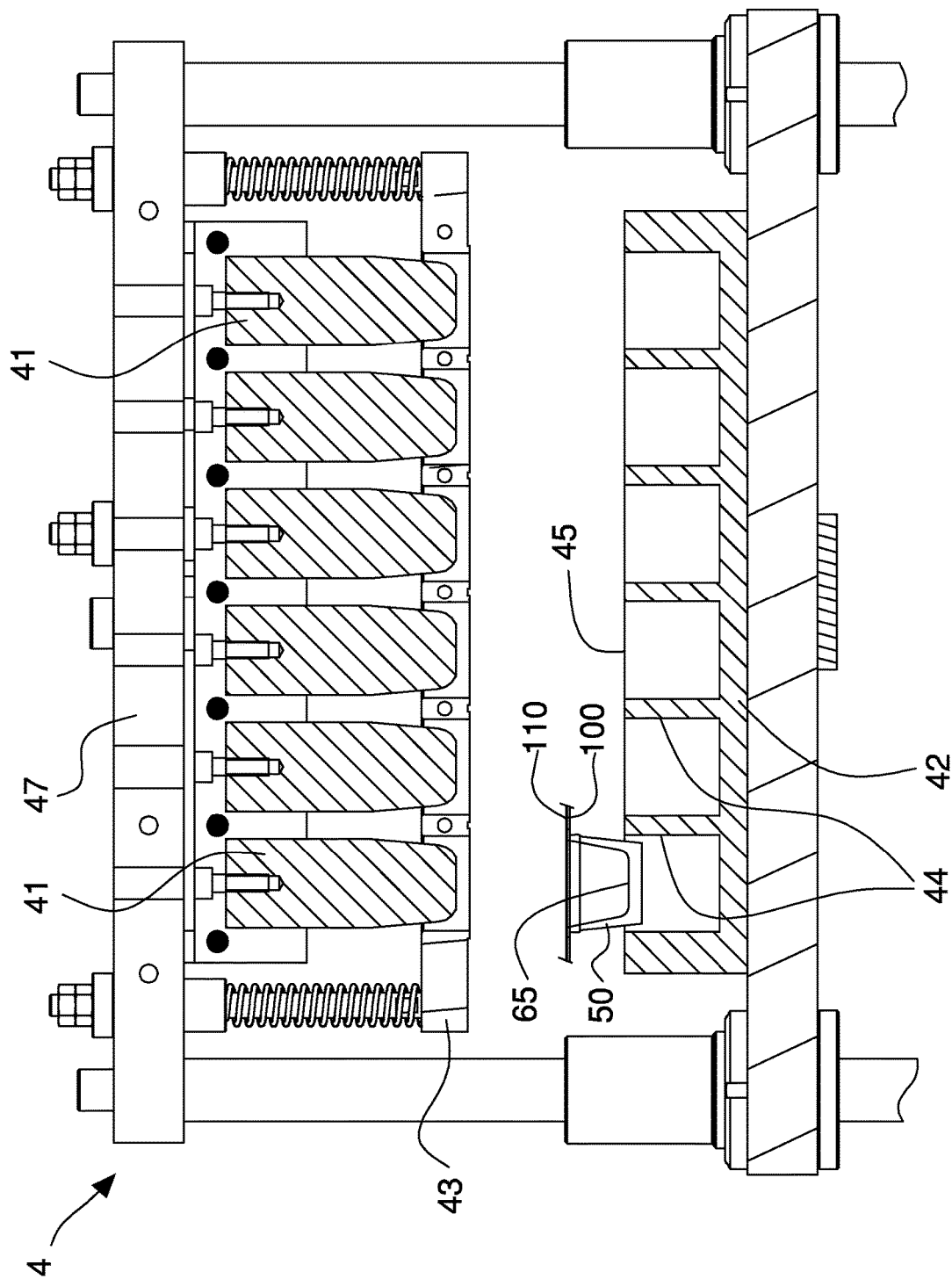
FIG. 4 is a cross-section of a second stretching station of the apparatus in FIG. 1.

The FIG. 4 illustrates the second stretching station 4 including a second stretching assembly including at least one second thermo regulated punch 41 and a second die 42 provided with at least one or more second housings 44 to receive respective shells 50 with corresponding filtering elements 65 sealed or welded thereto.

The second die 42 comprises a second wall 45 substantially frontal and facing the second punch 41 on which the second housings 44 are made and open. In the illustrated embodiment, the second stretching station 4 comprises a plurality of second punches 41, for example six, and the second die 42 comprises the same number of second housings 44. Each second punch 41 is movable and insertable inside the respective second housing 44 so as to further stretch and stabilize the filtering element 65 so as to complete and consolidate the shape of the letter one, at a temperature less than that with which the filtering element 65 has been formed by the first punch 31. The second punch 41 is made of a material with high thermal conductibility (for example steel, or steel and teflon), has a frusto-conical shape, and, for example, has an outline capable of defining the definitive shape of the filtering element 65.

The second stretching station 4 further includes a second locking device including a second locking element 43 movable and arranged for compressing and locking the shell 50 and the film 110 against the second wall 45 of the second die 42 in order to prevent the sealed or welded portions from yielding or undesired shifts of the shell 50 and/or the film 110 during the further stretching and stabilization step of the filtering element 65.

The locking assembly thus includes the first locking device 33 included in the first stretching station 3, the sealing locking device 21 and 22 included in the sealing station 2, and the second locking device 43 included in the second stretching station 4.

The second punches 41 are fixed to a second support element 47 movable along the third direction T towards, and away from, the second die 42. The second locking element 43 is also connected elastically to the second support element 47.

The second die 42 is also movable along the third movement direction T towards and away from each shell 50. More precisely, the second die 42 is movable between a respective first non-operative position, in which it is spaced apart from each shell 50 to allow the advancement thereof along the first direction F, and a respective operative position, in which it is in contact with each shell 50, in particular with the flange rim 55 of the shell 50, the shells 50 being inserted within the respective second housings 44.

With the second die 42 arranged in the respective operative position, the second support element 47 is moved towards the above-mentioned second die 42, so that the second locking element 43 compresses and locks against the second wall 45 the film 110 to each shell 50. By further moving the second support element 47, the second punches 41 engage with the respective filtering elements 65 that further stretch, deform and stabilize within the corresponding second housings 44. Each second punch 41 further forms the filtering element 65 by deforming it again until getting the definitive final shape, for example a frustum-conical shape.

The second punch 41 is thermo regulated at a second temperature T2 between 10° C. and 100° C., preferably between 30° and 70°, in particular 40°, less than the first temperature T1 at which the first punch 31 is heated, and hence the further deformation and stabilization of the filtering element 65 occurs substantially by cooling of the filtering element 65. In this manner, the arrangement of the threads of plastics contained in the filtering material of the film 110 can be stabilized. The filtering element 65 thus stably maintains its final shape which was conferred to it by the second punch 41. It is worth noting that the stretching by the second stretching device not only limits the elastic return of the fibers contained in the nonwoven fabric film 110 and stabilizes the definitive shape of the filtering element 65, but also stiffening and reinforcing the filtering material itself which, once it has been thinned, forms the side and bottom walls of the above-mentioned filtering element 65.

By virtue of the two successive stretching steps, a hot stretching at a first temperature T1 in the first stretching station 3 and at a second temperature T2, less than the first temperature T1, in the second stretching station 4, it is possible to make a filtering element 65 capable of containing the product and to efficiently and safely support the passage through the latter of a pressurized fluid, during a preparation procedure of a relative beverage.

Tests carried out by the applicant showed that, following the two successive stretching operations, the walls of the filtering element 65 have a thickness progressively and evenly decreasing starting from the peripheral portion 65b adjacent to the welded portion 58 of the flange rim 55 up to the bottom wall 65c. More precisely, the thickness of a side wall 65d of the filtering element 65 is equal to about 50-70% of the initial thickness of the film 110, while the thickness of the bottom wall 65c is equal to about 25-30% of the initial thickness of the film 110.

The apparatus 1 of the invention further comprises a cutting station 7 arranged downstream of the first stretching station 3 and of the second stretching station 4 to cut the sheet 100, in the case of a plurality of shells 50 obtained by thermoforming, associated to the film 101 so as to obtain the single capsules 60, i.e., the shells 50 provided with respective filtering elements 65. The separation is provided at the flange rim 55.

Instead, in the case of already mutually separated shells, if they have been made by injection moulding, the cutting station 7 obtains a single capsule by cutting at the flange rim 51 a perimeter as desired.

The capsules 60 thus manufactured can be used to supply a packaging machine of a conventional type, capable of dosing a product within the filtering elements and closing the thus filled capsules with a cover film.

The cutting station 7 comprises at least one third punch 71 cooperating with a third die 72 to separate each capsule 60 by cutting the film 110 and the sheet 100 at the welded portion 58. Such welded portion 58, hardened after the post-welding cooling allows a neat and accurate cut. In particular, the film 110 can be cut without generation of threads or fibers coming out from the cut edges, as occurs in the known apparatuses that cut separately the filtering material film.

In a version of the apparatus 1 of the invention, not illustrated in the figures, a filling station to dose a product within the filtering element 65 of each capsule 60, and a closing station to superimpose and fix a cover film to the film 110 and the sheet 100 so as to hermetically close inside the cavity 51 of the shell 50 the filtering element 65 with the product are provided. In this version of the apparatus 1, the cutting station 7 is located downstream of the filling station and of the closing station with reference to the first direction F.

In a further version of the apparatus 1 of the invention, not illustrated in the figures, sealing station 2 is provided downstream of both the first stretching station 3 and of the second stretching station 4 with reference to the first direction F. In this further version of the apparatus 1, the first locking device 33 of the first stretching station 3 locks the film 110 to the sheet 100 and/or the shell 50 superimposed by the superimposing assembly 6 to avoid shifting of the film 110 when the first stretching device 31 and 32 form the filtering element 65 and stretch the portion 111 of film 110 arranged facing the cavity 51. The second stretching assembly 41 and 42 included in the second stretching station 4 further stretches and stabilizes the filtering element 65, while the second locking assembly 43 of the second stretching station 4 prevents shifting of the film 110 associated with the shell 50.

The sealing locking device included in the sealing station 2 seals the shell 50 and the film 110 together when the filtering element 65 has already been definitively formed and stabilized.

In a further other version of the apparatus 1 of the invention, not illustrated in the figures, the sealing station 2 is provided downstream of the first stretching station 3 and upstream of the second stretching station 4, with reference to the first direction F.

In this further other version of the apparatus 1, the first locking element 33 locks the film 110 to the sheet 100 and/or to the shell 50 to avoid shifting the film 110 when the first stretching assembly 31 and 32 forms the filtering element 65.

The sealing locking device seals the shell 50 and the film 110, after the filtering element 65 has been formed and stretched by the first stretching assembly 31 and 32. The second stretching assembly 41 and 42 further stretches and stabilizes the filtering element 65 sealed to the shell 50.

It is noticed that, with reference to the further version and the further other version of the apparatus 1, in which the sealing station 2 is provided at least downstream of the first stretching station 3, the sealing station 2 is devoid of the pusher 26, since the welding of the film 110 to the shell 50 or to the sheet 100 is performed on a filtering element 65 already preliminarily (apparatus according to the further other version) or definitively (apparatus according to the further version) formed and stabilized.

The apparatus 1 according to these further versions illustrated above, can further be provided with a gripping and dragging device to keep each filtering element 65, already preliminarily and/or definitively formed and stabilized, associated with a respective shell 50 during the movement between the first stretching station 3 and/or the second stretching station 4 up to the sealing station 2. The gripping and dragging device locks the film 110 to the shell 50 between the operative stations and before the sealing station 2.

In use, the shells 50 are supplied along the movement plane starting from the superimposing assembly 6 to the sealing station 2 and subsequently to the first stretching station 3 and to the second stretching station 4, arranged downstream of the sealing station 2.

According to the alternative versions of the apparatus 1 of the invention, the shells 50 are supplied along the movement plane starting from the superimposing assembly 6 to the first stretching station 3 and, in sequence: to the second stretching station 4 (or to the sealing station 2) and to the sealing station 2 (or to the second stretching station 4) which are arranged downstream of the first stretching station 3.

The method of the invention for making a capsule 60 provided with a shell 50 containing a filtering element 65 suitable for receiving a product for preparing a beverage or the like, to therefore comprises the steps of:

applying to a shell 50 with a cavity 51, a film 110 of filtering material so as to cover an opening 52 of the cavity 51;

locking the film 110 to the shell 50;

heating and stretching a portion 111 of the film 110 facing the cavity 51 and locked to the shell 50 so as to form and obtain a filtering element 65.

The method further provides, after said heating and stretching the portion 111, further stretching and cooling the filtering element 65 so as to complete, stabilize, and consolidate the shape of the latter and to reinforce and stiffen the filtering material forming the side and bottom walls of the above-mentioned filtering element.

The method comprises, before said applying, optionally, forming the sheet 100 of material thermoformable so as to make thereupon at least the shell 50 provided with the cavity 51. The step of locking the film 110 to the shell 50 further comprises locking by welding the film 110 to the shell 50 itself and cutting the shell 50 and the film 110 at a flange rim 55 in which a welded portion 58 is present, arranged around a cavity 51 opening 52, thereby obtaining each capsule 60.

Such locking by welding step can be provided before said heating and stretching and said further stretching and stabilizing. If such locking by welding step is provided before the heating and stretching, it can be provided to push the portion 111 of the film 110 inside the cavity 51 by a preset amount L so that such portion 111 of the sheet 110 has such dimensions as to ensure that the film 110 does not tear or break or unduly get thin during the stretching steps necessary to form and obtain a filtering element 65 with desired dimensions and volume.

According to alternative versions of the method of the invention, it is provided to lock by welding after said heating and stretching or after also said further stretching and stabilizing. In these versions, it is anyhow provided to lock the film 110 to the shell 50 during said heating and stretching or during said further stretching and stabilizing.

After said heating and stretching and said further stretching and stabilizing, the shell 50 and the film 101 are cut at a welded portion 58 arranged around the opening 52 of the cavity 51, so as to separate each capsule 60 from the sheet material 100 or to define a final shape of the perimeter of the flange rim as desired.

In a version of the method, it is provided, after said heating and stretching, and after said further stretching and cooling, dosing a product within the filtering element 65 and superimposing and fixing a covering film to the film 110 and to the sheet 100 so as to hermetically close within the cavity 51 said filtering element 65 and said product.

Therefore, owing to the apparatus and the method of the invention, it is possible to make filtering elements 65 formed from a filtering material film 110 by associating them in an accurate ad efficient manner to the respective shells 50 so as to obtain capsules 60 ready to be filled with a product for the preparation of a beverage or the like.

Furthermore, if the shells 50 are obtained by thermoforming from a plastics sheet 100, it is noticed that advantageously both the shells 50 and the filtering elements 65 can be obtained in a single manufacturing process.

It is worth noting that the apparatus and method of the invention allow forming the filtering element 65 after the filtering material film 110 has been locked, or also locked by welding, to the shell 50. In this manner, it is possible to avoid the complex transfer and handling procedures of the filtering element according to the apparatuses and the methods of a known type. The filtering element 65 is further obtained by stretching or drawing of the filtering material film, and not by a simple folding operation. The two-step stretching process, first a hot stretching at a temperature T1 and next at a temperature T2, less than the temperature T1 that stabilizes it, in addition to allow conferring the desired shape to the filtering element 65, allows stabilizing such shape and reinforcing and stiffening the filtering material that, once it has been thinned, form the walls of the filtering element 65. Therefore, the apparatus and method of the invention allow associating in an absolutely accurate manner the filtering elements in the respective shells 50, since the above-mentioned filtering elements 65 are made within the same shells 65.

Unlike the known apparatuses and methods therefore, special devices for the transfer and insertion of the filtering elements (made in a relative operative station of the apparatus) in the shells are not necessary, the devices being complex and expensive, and generally result in a high number of capsules being rejected, due to the fragility and instability of the filtering elements once they have been folded and formed.

Finally, it is noticed that apparatus for making the capsules is simple and reliable, and allows obtaining a high productivity, for example by suitably dimensioning the operative stations, in particular, the number of punches and housings of the dies.

The invention claimed is:

1. Apparatus for making a capsule provided with a shell containing a cavity and a filtering element suitable for receiving a product, comprising
   a) a superimposing assembly for applying a film of filtering material to a flange rim extending from an edge of at least one shell around an opening of said cavity, said shell and said superimposed film being moved along a first advancement direction;
   b) a first welding locking assembly to lock a first portion of said film to said shell flange rim adjacent the cavity opening, a second portion of said film extending over said cavity opening, and
   c) a first stretching assembly in a first stretching station for heating said second portion of said film and stretching said second portion of said film into said cavity in an axial direction of said shell in order to form a filtering element within said shell cavity.

2. Apparatus according to claim 1, and further comprising a second stretching assembly in a second stretching station for further stretching and stabilising said filtering element within said shell cavity, said second stretching station being placed downstream of said first stretching station with reference to said first direction.

3. Apparatus according to claim 2, wherein said second stretching assembly comprises at least a second heat regulated punch and a second die provided with at least a second housing for receiving said shell with said filtering element sealed thereto, said second punch being movable and insertable into said shell within said second housing to further stretch and cool said filtering element to complete and stabilise the shape of said filtering element.

4. Apparatus according to claim 3, wherein said second stretching station comprises a third locking assembly including a second locking element that is movable and arranged for compressing and locking said shell flange rim and said first portion of said film against a second wall of said second die, said second housing being made on said second wall.

5. Apparatus according to claim 1, and further comprising a thermoforming station for thermoforming a thermoformable plastics sheet for forming said shell provided with said cavity, said thermoforming station being positioned upstream of said superimposing assembly with reference to said first direction.

6. Apparatus according to claim 1, wherein said first stretching assembly comprises at least one heated first punch and a first die provided with at least a first housing for receiving said shell with a respective first portion of film locked thereto, said first punch being movable and insertable into said shell within said first housing to heat and stretch said second portion of said film within said shell cavity and form said filtering element.

7. Apparatus according to claim 6 wherein said first stretching station comprises a second locking assembly comprising a first locking element that is movable and arranged for compressing and locking said shell and said first portion of said film against a first wall of said first die, said first housing being formed on said first wall.

8. Apparatus according to claim 1, and further comprising a sealing station for fixing said first portion of said film to said shell flange rim wherein said sealing station comprises a sealing locking device of said first welding locking assembly including a first abutting element provided with a sealing device and a second abutting element provided with an abutting wall and with at least a first seat for receiving said shell, said first abutting element being movable in such a manner that said sealing device compresses against said abutting wall and seals said shell flange rim and said first portion of said film together around said cavity opening.

9. Apparatus according to claim 8, wherein said sealing station is placed downstream of said first stretching station with reference to said first direction or downstream of said first stretching station and of a second stretching station with reference to said first direction.

10. Apparatus according to claim 8, wherein said sealing station is placed upstream of said first stretching station with reference to said first direction and wherein said first abutting element comprises at least one pushing element arranged for pushing said film second portion by a set amount into said cavity before said sealing device compresses said flange rim and said film first portion against said abutting wall.

11. Apparatus according to claim 8, and further comprising a cutting station located downstream of said first stretching station with reference to said first direction and arranged for cutting said shell and said first portion of said film sealed together in said sealing station in such a manner as to separate said capsule.

12. Apparatus according to claim 1, and further comprising a filling station for dosing a product inside said filtering element and a closing station for superimposing and fixing a covering film to said filtering film and said shell to hermetically close the filtering element and the product inside said shell cavity.

13. Apparatus according to claim 12, and further comprising a cutting station located downstream of said first stretching station with reference to said first direction and arranged for cutting said shell and said first portion of said film sealed together in said sealing station to separate said capsule, wherein said cutting, station is further located downstream of said filling station and of said closing station with reference to said first direction.

14. A method for making a capsule provided with a shell containing a filtering element suitable for receiving a product comprising the steps of
   a) applying a film of filtering material to a flange rim of a shell containing a cavity to cover an opening of said cavity;
   b) locking a first portion of said film to said shell flange rim adjacent said cavity opening, a second portion of said film extending over said cavity opening;
   c) heating the second portion of said film extending over said cavity opening and stretching the second portion of said film into said cavity in an axial direction of said shell in order to form and obtain a filtering element.

15. A method according to claim 14, and further comprising, after said heating and stretching step, the step of further stretching and stabilizing said filtering element to complete and stabilise the shape of said filtering element.

16. A method according to claim 14, and further comprising the step of forming one sheet of thermoformable material to form said shell provided with said cavity prior to said applying step.

17. A method according to claim 14, wherein said locking step comprises sealing said film to said shell flange rim and said method further comprises the step of cutting said shell and said film at a sealed portion placed around said cavity opening after said heating and stretching step to obtain said capsules.

18. A method according to claim 14, and further comprising the step of dosing a product inside said filtering element and superimposing and fixing a covering film to said shell flange rim and said filtering film after said heating and stretching step to hermetically close said filtering element and said product inside said cavity.

* * * * *